United States Patent [19]

Suter

[11] 4,217,009

[45] Aug. 12, 1980

[54] DENTAL CABINET APPLIANCE

[75] Inventor: Edwin Suter, Karlsruhe, Fed. Rep. of Germany

[73] Assignee: Sybron Corporation, Rochester, N.Y.

[21] Appl. No.: 971,363

[22] Filed: Dec. 20, 1978

[51] Int. Cl.[2] .......................... A61C 19/02; A47B 81/00

[52] U.S. Cl. ...................................... 312/209; 312/297; 297/84; 433/79

[58] Field of Search ............... 312/209, 208, 297, 321, 312/DIG. 33; 297/84, 85, 280, 282; 5/332; 32/22

[56] References Cited

U.S. PATENT DOCUMENTS

| | | | |
|---|---|---|---|
| 649,705 | 5/1900 | Pauly, Jr. | 312/297 |
| 1,396,291 | 11/1921 | Shaw | 312/208 |
| 2,500,095 | 3/1950 | Ries et al. | 32/22 |
| 2,869,616 | 1/1959 | Belisle | 297/84 |
| 2,869,955 | 1/1959 | LaRue | 312/297 |
| 3,094,353 | 6/1963 | Mizelle | 297/85 |
| 3,280,462 | 10/1966 | Deeley, Jr. | 312/209 |
| 3,514,171 | 5/1970 | McGaha | 32/22 |
| 3,718,972 | 3/1973 | Fox et al. | 32/22 |

FOREIGN PATENT DOCUMENTS

| | | | |
|---|---|---|---|
| 2030522 | 6/1970 | Fed. Rep. of Germany | 32/22 |
| 2041169 | 8/1970 | Fed. Rep. of Germany | 32/22 |
| 2141990 | 8/1971 | Fed. Rep. of Germany | 32/22 |
| 2220068 | 4/1972 | Fed. Rep. of Germany | 32/22 |
| 2316071 | 3/1973 | Fed. Rep. of Germany | 32/22 |
| 905708 | 9/1962 | United Kingdom | 5/332 |

*Primary Examiner*—Victor N. Sakran

*Attorney, Agent, or Firm*—Theodore B. Roessel; Roger Aceto

[57] ABSTRACT

A dental unit capable of positioning dental instruments at a location convenient to either a seated or standing dentist. The unit has the instrument holder mounted on a four-bar linkage for swinging the holder from a relatively low stored position to an in-use position. At a low point of the swing, the dental instruments are at a relatively low position and convenient to a seated dentist. The four-bar linkage is arranged so that at a higher point in the swing, the instrument holder is thrust to a relatively high position as may be convenient to a standing dentist.

4 Claims, 3 Drawing Figures

DENTAL CABINET APPLIANCE

TECHNICAL FIELD

The present invention relates to a dental unit and more particularly to a dental unit which can be located beneath a counter top. Within the unit is an instrument support which can be tilted between a stored position, wherein the dental instruments are contained within the unit, to an in-use position, wherein the dental instruments are presented outside of the unit.

Various dental units are known which can be located beneath counter tops. One such unit shown in German Pat. application No. 2,141,990 has an arrangement wherein the dental instruments, such as drills, syringes and the like are carried by a sliding carriage. The carriage in this case is slideable in a horizontal direction for bringing the instruments into a position of use. In this manner, the instruments are readily available to a dentist operating in the seated position.

Other units are known which can be stored under a counter top wherein the instrumentation is tilted downwardly from a stored to an in-use position. In this case the instruments when in use are at a lower elevation than when in the stored position so that such units are also limited to use by a dentist operating from a seated position.

There is considerable advantage in having dental instruments stored in cabinets beneath counter tops. For example, this saves space in the dental operatory and positions the dental instruments at a low elevation convenient to a dentist operating in the seated position. However, the efficiency of such equipment can be improved if it were possible to position the instrumentation so that it could be used by either a seated or standing dentist.

SUMMARY OF THE INVENTION

In the present invention, a dental unit has the support for the dental instrumentation and the control panel for controlling the flow of various utilities to the individual dental instruments arranged on a four-bar linkage which swings upwardly from a stored position beneath a counter top to permit utilization of the instrument at various elevations.

The advantages of the present invention as described herein in comparision with dental units according to the prior art are evident. For example, since the unit is low it can be integrated into a wall structure beneath a counter or table top. In addition because the instrument support is tilted or rotated upwardly to bring the instruments into use, the dental instruments can be positioned for use by either a standing or seated dentist. In this respect, if the dentist is operating from a seated position, the instrument support is pulled out only a short distance from its stored position. This keeps the instruments at a relatively low elevation. On the other hand, if the dentist is operating from a standing position, the instrument support is pulled a greater distance out of the dental unit. This rotates the instrument support outwardly and upwardly from within the dental unit to position the dental instruments at a higher elevation, more convenient to that standing dentist.

Having the instrument support mounted on a four-bar linkage also allows the instruments and the instrument control panel to be pushed downward and inward to a stored position wherein the structures are entirely behind the front edge of the unit so that a door or other mechanism can be moved to a position to completely conceal the instrumentation.

DETAILED DESCRIPTION OF INVENTION

Figure 1:
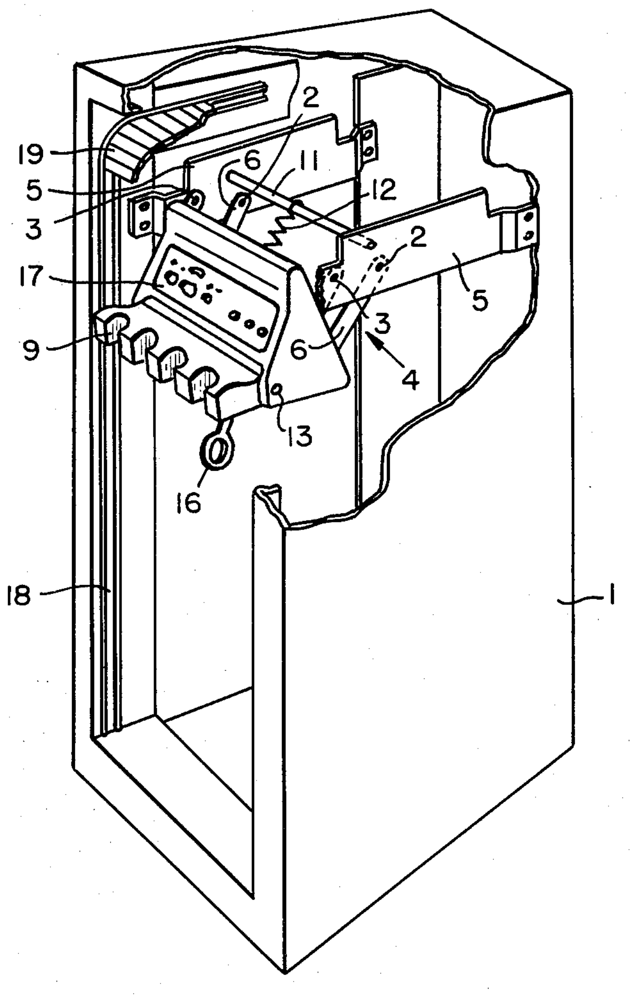
FIG. 1 is a prospective view of the dental unit with portions broken away to show the internal structure.

FIG. 1 shows the dental unit of the present invention as including a cabinet 1. The height of the cabinet is sufficient to permit storage below a standard counter top. If desired casters, or the like (not shown), can be provided to facilitate movement of the dental unit along a floor surface. The front of the cabinet 1 is open for purposes set out hereinbelow.

At each side of the cabinet 1 is a four-bar linkage 4. The elements forming the four-bar linkage at one side are identified with the same reference numbers as the same elements forming the four-bar linkage at the other side of the cabinet.

Each four-bar linkage 4 is mounted to a support 5 which extends along a side of the cabinet 1. The elements forming the four-bar linkage includes a pair of lever arms 6, 7. Each of these lever arms have one end pivoted to support member 5 at 2 and 3 respectively. A link 8 pivotally connects the opposite end of the levers 6 and 7. The levers 6 and 7, link 8 and the pivot attachment (2, 3) of levers 6 and 7 to support 5 form a four-bar linkage at each side of the dental cabinet.

Figure 2:
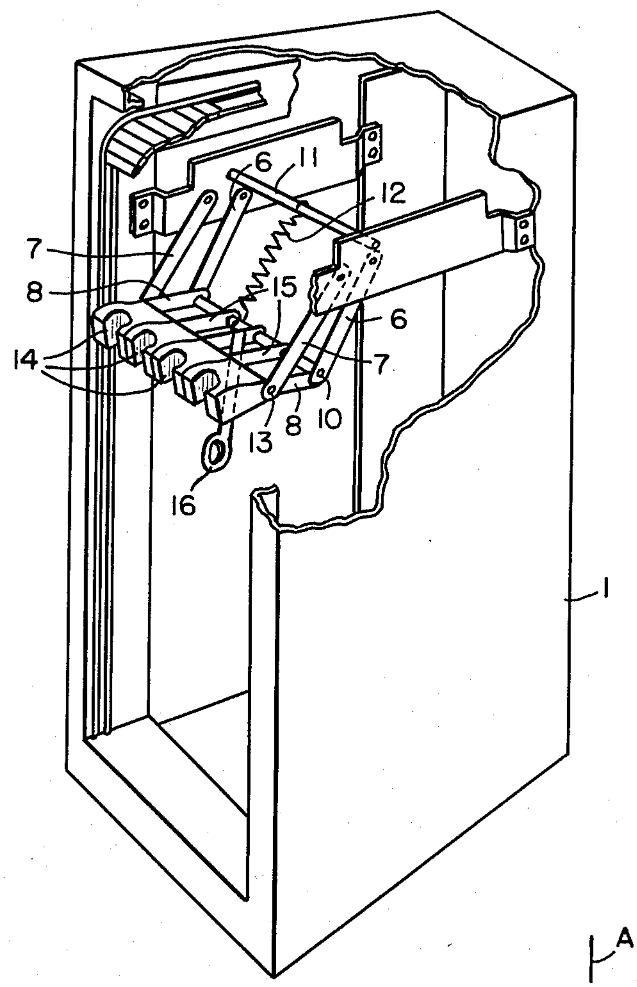
FIG. 2 is a view similar to FIG. 1 with the instrument control panel removed for clarity.

Extending between and connected to the lever arm 6 of each four-bar linkage is a rod 10 (FIG. 2). Rod 10 is connected to these lever arms at the point where link 8 is attached so that both four-bar linkages move together.

Extending between lever arms 7, and connected to each link 8 is an instrument holder. This holder can be one piece as shown at 9 in FIG. 1, or a plurality of individual holders as shown at 14 in FIG. 2.

Figure 3:
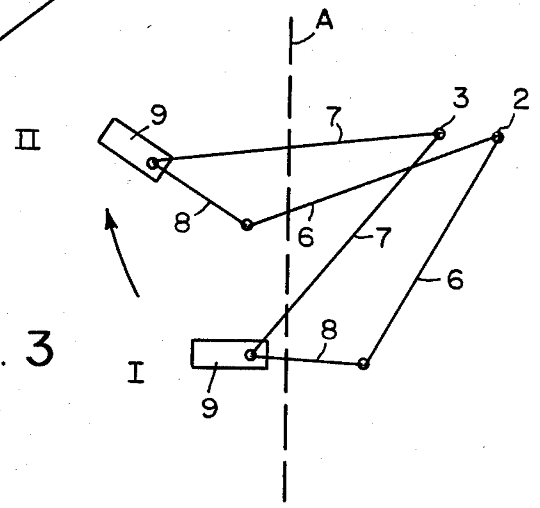
FIG. 3 is a schematic drawing showing the movement of the instrument support.

As best seen in FIGS. 2 and 3, link 8 is longer than the distance between the pivot points 2, 3. With this arrangement, movement of the four-bar linkage in the direction through the cabinet opening and upward, causes link 8 to swivel clockwise around the axis of rod 10 and towards lever arms 6 and 7. This action is best illustrated in FIG. 3. Movement of link 8 is transmitted to instrument holder 9 by means of friction between them. Accordingly, movement of link 8 acts to thrust the instrument holder upwardly as the four-bar linkage swings from a stored position within cabinet 1.

For example, in FIG. 3, the plane of the open front of the cabinet is represented schematically by the vertical dashed line A. Accordingly, when the four-bar linkage is pulled just enough to permit it to pass through the open front of the cabinet, (position I) the instrument holder will locate the dental instrument at a relatively low position convenient to a seated dentist. However, when the four-bar linkage is pulled to the limit of its travel (position II) the movement of link 8 about rod 10 thrusts the instrument holder upwardly. This inward thrust adds to the upward movement of the four-bar linkage so as to support the instruments at a relatively high position convenient to a standing dentist.

A second rod 11 extends between support members 5. Extending from rod 10 to rod 11 is a tension spring 12. This spring acts as a dead center spring with respect to the pivoting of lever arm 6 so as to hold the four-bar linkage against stops (not shown) at the limits at its range of travel.

Lever arms 7 pivotally connected to the links 8 and to the ends of instrument holder 9. Bolts 13 provide sufficient friction between links 8 and instrument holder 9 to transmit movement of the links to the instrument holder. To hold the four-bar linkage in any intermediate position against the action of tension spring 12 suitable friction means are provided between support members 5 and lever arms 7 by pivots 3.

If desired, a useful feature may be provided by dividing the instrument holder 9 into a plurality of individual holders 14 as shown in FIG. 2. If this is done each of the individual instrument holders can be arranged at a definite angle to each other so as to facilitate the selection of instruments and allow the densist to differentiate one instrument from another. Also if there are individual instrument holders, auxiliary links 15 can be provided between rod 10 and the individual instrument holders. These links 15 will permit the operator to set the initial position of each instrument holder 14 with respect to the others. This relative positioning will then be maintained as the four-bar linkage is moved. In this manner, selected ones of the instrument holder may be positioned out-of-line with other instrument holders to facilitate selection and replacement of individual instruments.

Any suitable means such as a handle 16 may be provided for moving the four-bar linkage between the stored and in-use positions. In this respect, handle 16, as shown in FIG. 2 may be attached to a link 15 or to rod 10 and extend downward below the four-bar linkage.

As shown in FIG. 1 a control panel 17 may be fixed to the lever arms 7. The inclination or tilting of control panel 17 will then correspond to that of the lever arm. In this manner the control panel may be presented at a convenient low position when utilized by a seated dentist. Also when the four-bar linkage is pulled higher to permit use by a standing dentist, the control mechanism will be in a convenient high position. In this way, the most convenient position of the control panel is presented regardless of whether the dentist is operating from a standing or seated position.

When the instrument holder (9, 14) is pushed to a stored position within cabinet 1, the various dental instruments (not shown) carried by the holder are all located behind the plane of the cabinet opening. In this position any suitable means such as a roll shutter 19 riding in a track 18 can be used to close the cabinet opening.

We claim:

1. A dental unit comprising:

(a) a cabinet having side walls and an open front;

(b) an instrument holder for releasably supporting a plurality of dental instruments, said holder being movable from a stored position within said cabinet through said open front to an in-use position;

(c) a four-bar linkage connecting said instrument holder to said cabinet side walls including a pair of lever arms each pivotally connected at a first end to said side wall and each pivotally connected at a second end to said instrument holder for swinging said instrument holder in a vertical plane out and up from a first, relatively low storage position in said cabinet, to a second, in-use position outside of said cabinet; and (d) said lever arms having their second ends spaced further apart than said first ends to rotate said instrument holder in a direction towards said lever arms as said lever arms swing said holder to an in-use position.

2. A dental unit as in claim 1 including a tension spring between said cabinet and the second ends of said lever arms for holding said linkage at either of its end positions.

3. A dental unit as in claim 2 including friction means between said four-bar linkage and said side walls to maintain said instrument holder in an intermediate position against the bias of said tension spring.

4. A dental unit as in claim 1 including a link extending between and pivotally connected to said second ends of said lever arms, said instrument holder being an extension of said link.

* * * * *